US011415662B2

(12) United States Patent
Ahn et al.

(10) Patent No.: US 11,415,662 B2
(45) Date of Patent: Aug. 16, 2022

(54) ELECTRONIC DEVICE FOR DETECTING LOCATION OF USER AND METHOD THEREOF

(71) Applicant: Samsung Electronics Co., Ltd., Suwon-si (KR)

(72) Inventors: Jungho Ahn, Suwon-si (KR); Jun Yoo, Suwon-si (KR); Chulkwi Kim, Suwon-si (KR); Jaeil Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 16/701,735

(22) Filed: Dec. 3, 2019

(65) Prior Publication Data

US 2020/0182962 A1 Jun. 11, 2020

(30) Foreign Application Priority Data

Dec. 7, 2018 (KR) ........................ 10-2018-0157437

(51) Int. Cl.
*G01B 11/14* (2006.01)
*G08B 13/14* (2006.01)
(Continued)

(52) U.S. Cl.
CPC ................ *G01S 5/163* (2013.01); *G01S 5/14* (2013.01); *G01S 13/46* (2013.01);
(Continued)

(58) Field of Classification Search
CPC . G01S 5/163; G01S 5/14; G01S 13/46; G01S 2013/466; G01S 2013/468;
(Continued)

(56) References Cited

U.S. PATENT DOCUMENTS 6,138,912 A 10/2000 Mitsuno
6,140,941 A * 10/2000 Dwyer ................ G07B 15/063
340/928

(Continued)

FOREIGN PATENT DOCUMENTS

CN 108389291 A 8/2018
EP 2 894 610 A1 7/2015
(Continued)

OTHER PUBLICATIONS

International Search Report with Written Opinion dated Mar. 19, 2020; International Appln. PCT/KR2019/017000.
(Continued)

*Primary Examiner* — Mark G. Pannell
(74) *Attorney, Agent, or Firm* — Jefferson IP Law, LLP

(57) ABSTRACT

An electronic device is provided. The electronic device includes a plurality of antennas to communicate with an external electronic device and at least one processor operatively connected to the plurality of antennas. The processor is configured to detect a tracking start event using an external magnetic material positioned at a location adjacent to the electronic device, to track a location of the external electronic device using the plurality of antennas and, while the tracking is performed, to obtain a height value of the external electronic device when an angle between the electronic device and the external electronic device is a specified angle. The processor is further configured to change a specified condition based on the obtained height value, to detect a tracking end event based on the specified condition, and to change an operating mode associated with the electronic device in response to detecting the tracking end event.

20 Claims, 13 Drawing Sheets

(51) Int. Cl.

| | | |
|---|---|---|
| *H04Q 5/22* | (2006.01) | |
| *G08B 13/00* | (2006.01) | |
| *G01S 5/16* | (2006.01) | |
| *G01S 5/14* | (2006.01) | |
| *G01S 13/46* | (2006.01) | |
| *H04W 4/029* | (2018.01) | |
| *H04W 8/00* | (2009.01) | |
| *H04W 64/00* | (2009.01) | |
| *H04M 1/72412* | (2021.01) | |

(52) U.S. Cl.
CPC ....... *H04M 1/72412* (2021.01); *H04W 4/029* (2018.02); *H04W 8/005* (2013.01); *H04W 64/003* (2013.01); *H04W 64/006* (2013.01); *G01S 2013/466* (2013.01); *G01S 2013/468* (2013.01)

(58) Field of Classification Search
CPC ... H04W 4/029; H04W 8/005; H04W 64/003; H04W 64/006; H04M 1/72412
USPC ........................................................ 356/623
See application file for complete search history.

(56) References Cited

U.S. PATENT DOCUMENTS

| | | | | |
|---|---|---|---|---|
| 6,310,548 | B1* | 10/2001 | Stephens, Jr. .......... | G08B 13/08 340/545.1 |
| 6,982,656 | B1* | 1/2006 | Coppinger ............. | G06Q 10/08 340/988 |
| 7,283,052 | B2* | 10/2007 | Bohman ................ | B65D 90/00 340/693.9 |
| 8,830,122 | B2 | 9/2014 | Menegozzi et al. | |
| 8,989,053 | B1* | 3/2015 | Skaaksrud ............. | H04W 4/38 370/255 |
| 9,082,099 | B1* | 7/2015 | Kolchin ............... | G06Q 10/083 |
| 9,539,178 | B1* | 1/2017 | Valerino, Sr. .......... | G07F 9/001 |
| 9,613,511 | B2 | 4/2017 | Ghose et al. | |
| 9,822,553 | B1* | 11/2017 | Ho ..................... | E05B 47/0012 |
| 9,924,387 | B2 | 3/2018 | Aldana et al. | |
| 9,959,439 | B1* | 5/2018 | Lui ................... | G06Q 10/0833 |
| 9,973,949 | B2 | 5/2018 | Aldana et al. | |
| 10,021,583 | B2 | 7/2018 | Cheng et al. | |
| 10,211,524 | B2 | 2/2019 | Hozouri | |
| 10,438,033 | B1* | 10/2019 | Solomon ............ | G06K 7/10415 |
| 10,444,385 | B1* | 10/2019 | Newman ............... | G01T 1/2907 |
| 2008/0059988 | A1* | 3/2008 | Lee ................. | H04N 21/44204 725/9 |
| 2010/0141153 | A1* | 6/2010 | Recker ................ | H05B 45/357 315/149 |
| 2012/0112910 | A1* | 5/2012 | Meyers ................. | G08B 13/08 340/547 |
| 2013/0332271 | A1* | 12/2013 | Hay ..................... | G06Q 20/208 705/16 |
| 2014/0074257 | A1* | 3/2014 | Bhargava .............. | H04L 12/282 700/47 |
| 2015/0068069 | A1* | 3/2015 | Tran ........................ | A43B 3/34 340/693.1 |
| 2015/0204561 | A1* | 7/2015 | Sadwick ............ | G05D 23/1905 236/1 C |
| 2015/0287296 | A1* | 10/2015 | Hall ....................... | H04N 7/181 340/541 |
| 2015/0349917 | A1* | 12/2015 | Skaaksrud ............ | H04L 1/0006 370/328 |
| 2016/0019495 | A1* | 1/2016 | Kolchin ................. | G06Q 10/0833 705/333 |
| 2016/0133120 | A1 | 5/2016 | Reibel | |
| 2016/0323393 | A1* | 11/2016 | Umphreys ............. | H04L 67/22 |
| 2016/0353239 | A1* | 12/2016 | Kjellsson ........... | G07C 9/00309 |
| 2017/0116483 | A1* | 4/2017 | Richardson ............ | G06F 3/017 |
| 2018/0336777 | A1 | 11/2018 | Lifshitz et al. | |
| 2018/0357837 | A1 | 12/2018 | Ieuji et al. | |
| 2019/0013960 | A1* | 1/2019 | Sadwick ................ | H05B 47/19 |
| 2019/0057566 | A1* | 2/2019 | Mlynarczyk ............ | G07C 9/20 |
| 2019/0172331 | A1* | 6/2019 | Hall ................... | G08B 13/2451 |
| 2019/0252814 | A1* | 8/2019 | Richardson .......... | H05K 5/0256 |
| 2019/0279445 | A1* | 9/2019 | Gallagher ................ | G07C 9/25 |
| 2019/0385373 | A1* | 12/2019 | Mittleman .............. | G06T 15/30 |
| 2020/0062183 | A1* | 2/2020 | Smith ...................... | B60R 3/02 |
| 2020/0267515 | A1* | 8/2020 | Stapleford ............. | H04W 4/14 |
| 2020/0334936 | A1* | 10/2020 | Estill ................. | G06Q 10/0836 |
| 2020/0349786 | A1* | 11/2020 | Ho ....................... | G06V 40/172 |
| 2020/0412070 | A1* | 12/2020 | Owen ..................... | G05F 3/02 |
| 2021/0249882 | A1* | 8/2021 | Baldasare ............. | G06V 20/52 |

FOREIGN PATENT DOCUMENTS

| | | |
|---|---|---|
| GB | 2561104 A | 10/2018 |
| JP | 2001-143111 A | 5/2001 |
| JP | 2001-195687 A | 7/2001 |
| JP | 2002-190041 A | 7/2002 |
| JP | 2008-071113 A | 3/2008 |
| KR | 10-2008-0078576 A | 8/2008 |
| KR | 10-2014-0040803 A | 4/2014 |
| KR | 10-2017-0117057 A | 10/2017 |
| KR | 10-2018-0026469 A | 3/2018 |
| KR | 10-2018-0026470 A | 3/2018 |

OTHER PUBLICATIONS

European Search Report dated Nov. 8, 2021; European Appln. No. 19894362.3-1206/3857923 PCT/KR2019017000.

* cited by examiner

ELECTRONIC DEVICE FOR DETECTING LOCATION OF USER AND METHOD THEREOF

CROSS-REFERENCE TO RELATED APPLICATION(S)

This application is based on and claims priority under 35 U.S.C. § 119(a) of a Korean patent application number 10-2018-0157437, filed on Dec. 7, 2018, in the Korean Intellectual Property Office, the disclosure of which is incorporated by reference herein in its entirety.

BACKGROUND

1. Field

The disclosure relates to an electronic device for detecting a location of a user and a method thereof.

2. Description of Related Art

With the development of Internet of things (IoT) technologies and sensor technologies, an electronic device positioned in a building (e.g., a house or an office) may provide various services by detecting the location of a user. For example, the electronic device may be positioned at a location adjacent to the door of the building and may detect whether the user passes through the door, and thus the electronic device may identify whether the user is located at the outside of the building or whether the user is located at the inside of the building. When it is identified that the user is positioned at the outside of the building, the electronic device may set a security mode for preventing the intrusion of a third party or may also perform a power saving mode for reducing the power consumption of other IoT devices positioned at the inside. When it is identified that the user is positioned at the inside of the building, the electronic device may release the security mode or the power saving mode.

There are various technologies capable of detecting the location of a user, for example, an electronic device may detect the location of the user by transmitting or receiving a signal to or from an external electronic device (e.g., a key device) held by the user in a wireless environment. The electronic device may detect the distance (or straight-line distance) between the electronic device and the external electronic device using the time of flight (ToF) of the signal or may detect the direction (or angle) where the external electronic device is located, by measuring the angle of arrival (AoA) using a plurality of antennas.

The external electronic device may be manufactured smaller to provide portability to the user. The user may hold the external electronic device at any location. For example, the user may hold the external electronic device at the location of the user's top pocket, bottom pocket, bag, or suitcase. In this case, the distance or angle detected by the electronic device may vary depending on the location of the external electronic device held by the user, and thus the accuracy for the user's location may be reduced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an electronic device for detecting the location of a user regardless of the location of an external electronic device held by the user and a method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of antennas to communicate with an external electronic device and at least one processor operatively connected to the plurality of antennas. The at least one processor may be configured to detect a tracking start event using an external magnetic material positioned at a location adjacent to the electronic device, to track a location of the external electronic device using the plurality of antennas, and while the tracking is performed, to obtain a height value of the external electronic device when an angle between the electronic device and the external electronic device is a specified angle and change a specified condition based on the obtained height value.

In accordance with another aspect of the disclosure, the at least one processor may be further configured to detect a tracking end event of the tracking based on the specified condition, and to change an operating mode associated with the electronic device in response to detecting the tracking end event.

In accordance with another aspect of the disclosure, a method of an electronic device is provided. The method includes detecting a tracking start event using an external magnetic material positioned at a location adjacent to the electronic device, tracking a location of the external electronic device, and obtaining a height value of the external electronic device while the tracking is performed when an angle between the electronic device and the external electronic device is a specified angle, and changing a specified condition based on the obtained height value while the tracking is performed.

In accordance with another aspect of the disclosure, the method includes detecting a tracking end event based on the specified condition, and changing an operating mode associated with the electronic device in response to detecting the tracking end event.

In accordance with another aspect of the disclosure, an electronic device is provided. The electronic device includes a plurality of antennas to exchange a signal in UWB with an external electronic device and at least one processor operatively connected to the plurality of antennas and processing a signal based on a UWB protocol.

In accordance with another aspect of the disclosure, the at least one processor may be configured to detect a tracking start event using an external magnetic material positioned at a location adjacent to the electronic device, to track a location of the external electronic device using the plurality of antennas, and while the tracking is performed, to obtain a height value of the external electronic device when an angle between the electronic device and the external electronic device is '0' and to change a specified condition based on the obtained height value.

In accordance with another aspect of the disclosure, the at least one processor may be further configured to detect a tracking end event based on the specified condition, and to change an operating mode associated with the electronic device in response to detecting the tracking end event.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, in the embodiments to be described, the parameter (e.g., distance, height, time, or magnetic force) capable of being expressed by figures may be referred to as a 'parameter (e.g., distance)', a 'parameter value (e.g., distance value)', 'parameter data (e.g., distance data)', or 'parameter information (e.g., distance information)' or these may be referred to interchangeably.

Figure 1A:
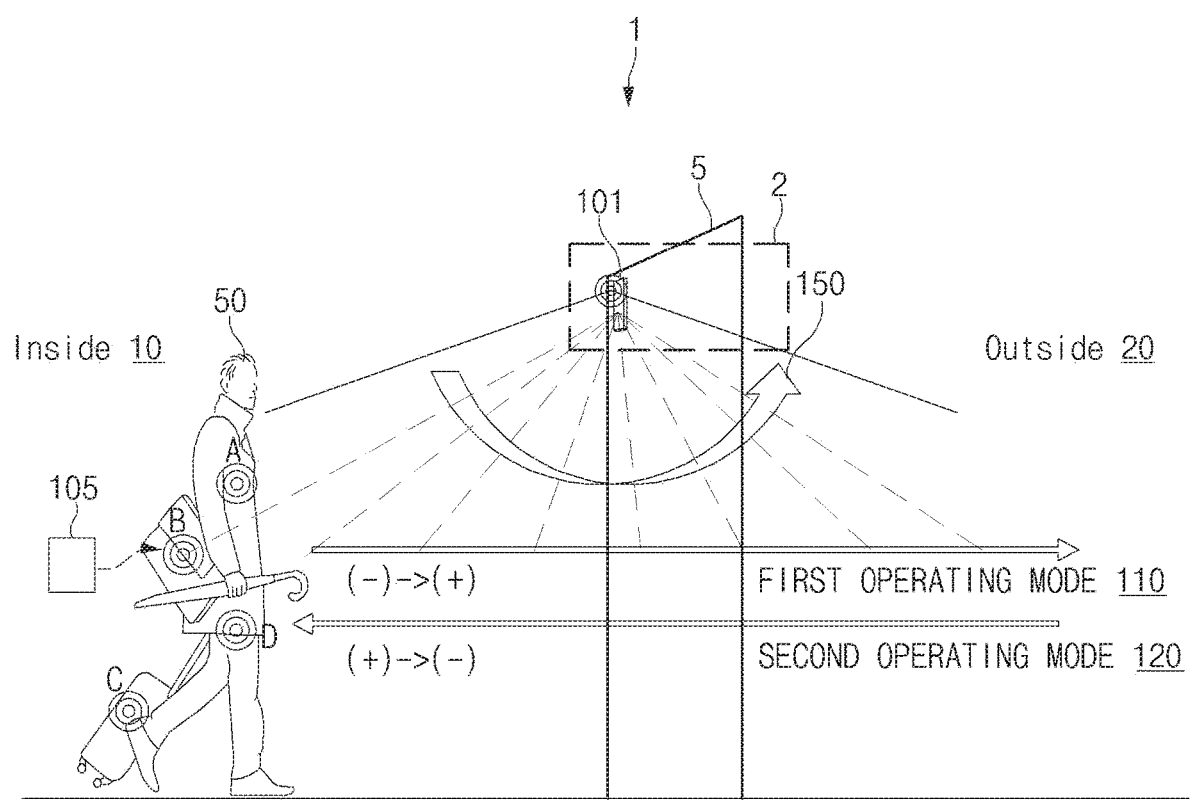
FIG. 1A illustrates an operating environment for tracking a location of a user, according to an embodiment of the disclosure.

FIG. 1A illustrates an operating environment for tracking a location of a user, according to an embodiment of the disclosure.

Figure 1B:
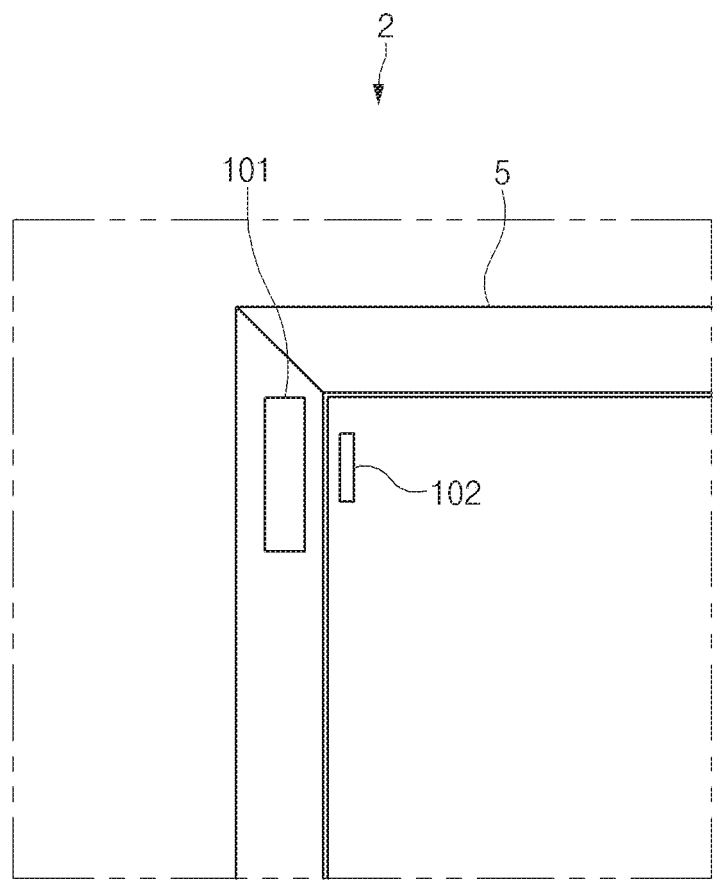
FIG. 1B illustrates an electronic device disposed at a location adjacent to a door of a building, according to an embodiment of the disclosure.

FIG. 1B illustrates an electronic device disposed at a location adjacent to a door of a building, according to an embodiment of the disclosure.

Referring to FIG. 1A, an electronic device 101 may track the location of a user 50 in an operating environment 1. The electronic device 101 may be referred to as a "sensor" or a "tracking device". According to an embodiment, the tracking operation may mean an operation of repeatedly detecting the location of the user.

For example, the electronic device 101 may detect the location of an external electronic device 105 by exchanging a signal with the external electronic device 105 held by the user 50 in a wireless environment. The location may be determined based on at least one of the distance (e.g., ToF) between the external electronic device 105 and the electronic device 101 or the direction (or angle) (e.g., AoA) of the external electronic device 105 to the electronic device 101. The electronic device 101 may repeatedly detect the location of the external electronic device 105 by transmitting or receiving the signal in a specified frequency band periodically. The electronic device 101 may identify the location of the user 50 holding the external electronic device 105, through the location of the external electronic device 105.

According to an embodiment, the electronic device 101 may detect the location of the external electronic device 105 by transmitting or receiving the signal in an ultra-wide band (UWB). Because the UWB technology-based signal having a wide frequency bandwidth and a pulse of the signal is short, the accuracy of location measurement may be high.

According to an embodiment, the electronic device 101 may track the location of the user 50 within a specified angle range 150 (e.g., 120 degrees, 140 degrees, or so forth).

According to an embodiment, the electronic device 101 may be disposed adjacent to a door 5 of a building and may track the location of the user 50; accordingly, the electronic device 101 may detect whether the user 50 is positioned in an inside 10 of the building or whether the user 50 is positioned in an outside 20 of the building. For example, assuming that the location of door 5 is '0' on the x-axis, when the location of the external electronic device 105 on the x-axis is changed from (−) value to (+) value, the electronic device 101 may identify that the user 50 is located at the outside 20 of the building; when the location of the external electronic device 105 on the x-axis is changed from (+) value to (−) value, the electronic device 101 may identify that the user 50 is located at the inside 10 of the building.

According to an embodiment, the electronic device 101 may change an operating mode associated with the electronic device 101, depending on the location of the user 50. For example, when the user 50 (i.e., the external electronic device 105) is located at the outside 20 of the building, the electronic device 101 may change the operating mode to a first operating mode 110; when the user 50 is located at the inside 20 of the building, the electronic device 101 may change the operating mode to a second operating mode 120. For example, the first operating mode 110 may include at least one of a security mode for preventing a third party from entering the building or a power saving mode for reducing the power consumption of IoT devices disposed inside the building. For example, the second operating mode 120 may include at least one of a security release mode or a power saving release mode.

According to an embodiment, for battery efficiency, the electronic device 101 may trigger tracking depending on whether the door 5 is opened.

Referring to FIG. 1B in which a partial area 2 of the door 5 is enlarged, the electronic device 101 may be disposed at the periphery of the door 5 and an external magnetic material 102 may be disposed at a location adjacent to the electronic device 101. When the magnetic force between the external magnetic material 102 and the electronic device 101 is less than a threshold value (i.e., when the door 5 is opened), the electronic device 101 may detect the start event of the tracking and may track the location of the external electronic device 105.

According to an embodiment, the electronic device 101 may terminate the tracking based on the specified condition. While the tracking is performed, when the magnetic force between the external magnetic material 102 and the electronic device 101 is not less than the threshold value (i.e., the door 5 is closed) and when the specified condition is satisfied, the electronic device 101 may detect the end event of the tracking. For example, when time goes beyond the reference time (e.g., 2 seconds) or more after the magnetic force is not less than the threshold value, when the distance (straight-line distance) between the electronic device 101 and the external electronic device 105 is not less than the reference distance (e.g., 2.5 m) after the magnetic force is not less than the threshold value, or when the angle between the electronic device 101 and the external electronic device 105 is out of the reference angle (e.g., 120 degrees) after the magnetic force is not less than the threshold value, the electronic device 101 may detect the end event of the tracking. In this specification, the angle between the electronic device 101 and the external electronic device 105 may represent the double of the incidence angle formed when the signal transmitted from the external electronic device 105 is received by the electronic device 101.

According to an embodiment, the electronic device 101 may determine whether the user 50 is located at the inside 10 or the outside 20, depending on the location of the external electronic device 105 detected when the tracking is terminated.

According to an embodiment, the external electronic device 105 may transmit a signal to the electronic device 101 or may receive a signal from the electronic device 101. The external electronic device 105 may be referred to as a "key device". According to an embodiment, the external electronic device 105 may transmit or receive a UWB-based signal. When the user 50 holding the external electronic device 105 is positioned at the inside 10 or the outside 20 of the building, the electronic device 101 may change an operating mode.

According to an embodiment, the user 50 may hold the external electronic device 105 at any location. For example, the user 50 may hold the external electronic device 105 in a top pocket A, a bag B, a suitcase C, or a bottom pocket D. A malfunction may occur while the tracking is performed depending on the location of the external electronic device 105 held by the user 50. For example, when the external electronic device 105 is positioned at a place (e.g., the top pocket A) higher than a threshold height value (e.g., 1 m), the external electronic device 105 may be out of a specified angle range 150 before the time reaches a reference time (e.g., 2 seconds) after the door 5 is closed. Because the phase of a signal is significantly changed when the external electronic device 105 is out of the specified angle range 150, the accuracy of the tracking may be reduced.

According to various embodiments, the electronic device 101 may adjust the specified condition for detecting the end event of the tracking, based on the height of the external electronic device 105 held by the user 50. For example, when the external electronic device 105 is positioned at a place higher than the threshold height value, the electronic device 101 may set the reference angle to be less than the default value (e.g., 120 degrees), may set the reference time to be less than the default value (e.g., 2 seconds), or may set the reference distance to be less than the default value (e.g., 2.5 m). For another example, when the angle between the electronic device 101 and the external electronic device 105 is not less than the reference angle (or the specified angle range), the electronic device 101 may estimate an angle value based on the distance value without measuring the angle while a tracking operation is performed.

Figure 2:
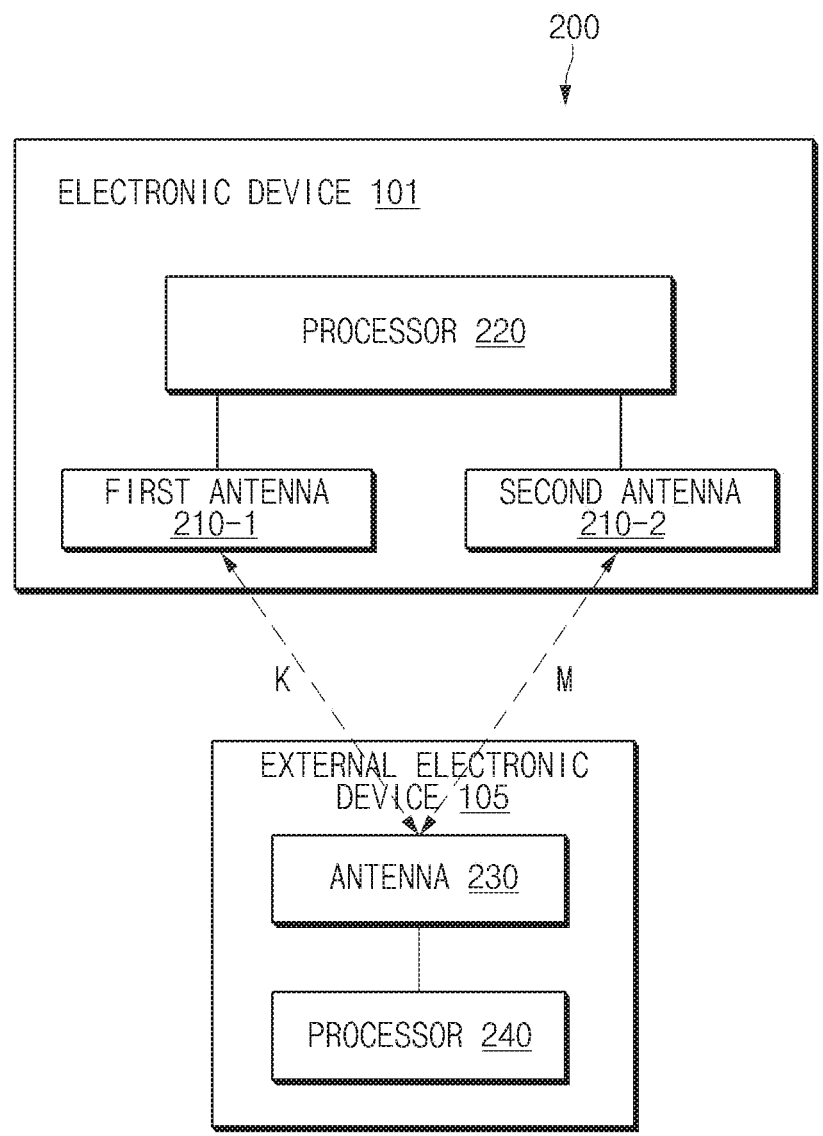
FIG. 2 is a block diagram of an electronic device and an external electronic device, according to an embodiment of the disclosure.

FIG. 2 is a block diagram of an electronic device and an external electronic device, according to an embodiment of the disclosure.

Referring to FIG. 2, a block diagram 200 of the electronic device 101 and external electronic device 105 of FIG. 1A is shown. The electronic device 101 may include a plurality of antennas 210-1 and 210-2 and at least one processor 220 operatively connected to the plurality of antennas 210-1 and 210-2. The components illustrated in FIG. 2 are the exemplifications only, and embodiments are not limited thereto. The electronic device 101 may further include other components in addition to the components illustrated in FIG. 2. For example, the electronic device 101 may further include at least one of the components of an electronic device 1201 illustrated in FIG. 12.

According to an embodiment, in a wireless environment, the plurality of antennas 210-1 and 210-2 may transmit a signal to the external electronic device 105 or may receive a signal from the external electronic device 105. The number of antennas may not be limited to the number illustrated in FIG. 2. According to an embodiment, the plurality of antennas 210-1 and 210-2 may transmit or receive a UWB technology-based signal to improve the accuracy of location measurement.

According to an embodiment, the processor 220 may be a chip forming a single processor or a module including at least one processor. The processor 220 may perform the overall functions of the electronic device 101.

According to an embodiment, the processor 220 may detect the start event of the tracking through an external magnetic material (e.g., 102 of FIG. 1B). For example, when the magnetic force between the external magnetic material and the electronic device 101 is less than a threshold value, the processor 220 may detect the start event of the tracking.

According to an embodiment, the processor 220 may track the location of the external electronic device 105 through the plurality of antennas 210-1 and 210-2, in response to detecting the start event of the tracking. For example, the processor 220 may periodically transmit or receive the UWB-based signal (e.g., K or M) through the plurality of antennas 210-1 and 210-2. The processor 220 may obtain the distance value between the electronic device 101 and the external electronic device 105, using the ToF of the signal or may obtain the angle value between the electronic device 101 and the external electronic device 105, through the phase difference between a plurality of signals.

According to an embodiment, the processor 220 may obtain the height value of the external electronic device 105 while the tracking is performed and may adjust the specified condition based on the obtained height value. For example, the processor 220 may change at least one of the reference time, the reference distance, or the reference angle in the specified condition, based on the height value.

According to an embodiment, when the location of the external electronic device 105 is out of the specified angle range (e.g., 150 of FIG. 1A), the processor 220 may estimate the angle value based on the distance value, without measuring the angle while the tracking operation is performed.

According to an embodiment, when the end event of the tracking is detected, the processor 220 may change the operating mode associated with the electronic device 101.

According to an embodiment, for the purpose of notifying the user 50 that the operating mode is changed, the processor 220 may provide the user 50 with a user interface (UI) indicating that the operating mode is changed. For example, the processor 220 may output at least one of light, sound, or vibration through an output device (e.g., at least one of a display device 1260, a sound output device 1255, or a haptic module 1279 of FIG. 12). For another example, the processor 220 may transmit data indicating that the change of the operating mode, to another electronic device (e.g., a smartphone or a wearable device) held by the user 50, and thus may induce the user 50 to recognize the change of the operating mode by the other electronic device.

According to an embodiment, the external electronic device 105 may include an antenna 230 and at least one processor 240. The antenna 230 may perform functions the same as or similar to the functions of the plurality of antennas 210-1 and 210-2 included in the electronic device 101. The processor 240 may process the signal transmitted or received through the antenna 230.

Figure 3:
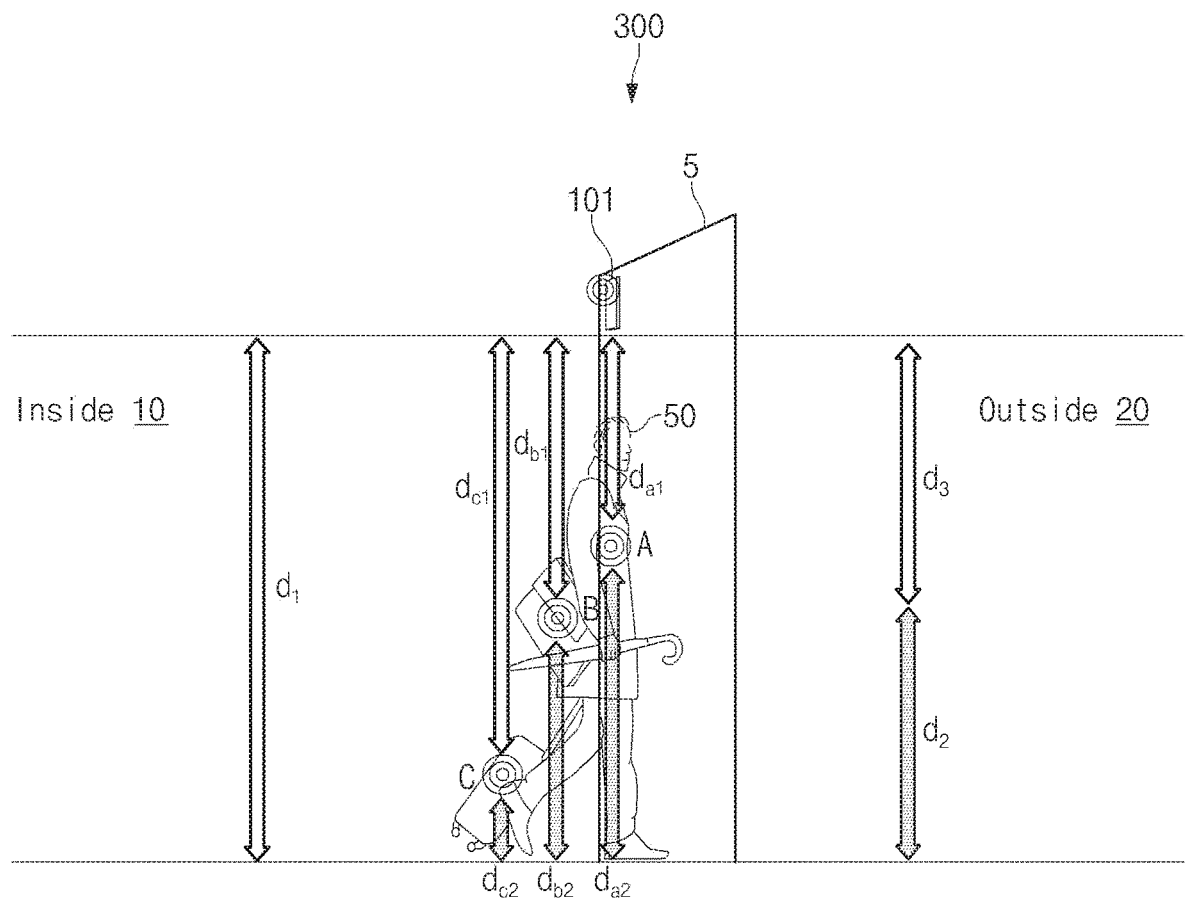
FIG. 3 illustrates an operating environment for obtaining a height value of an external electronic device, according to an embodiment of the disclosure.
Figure 4:
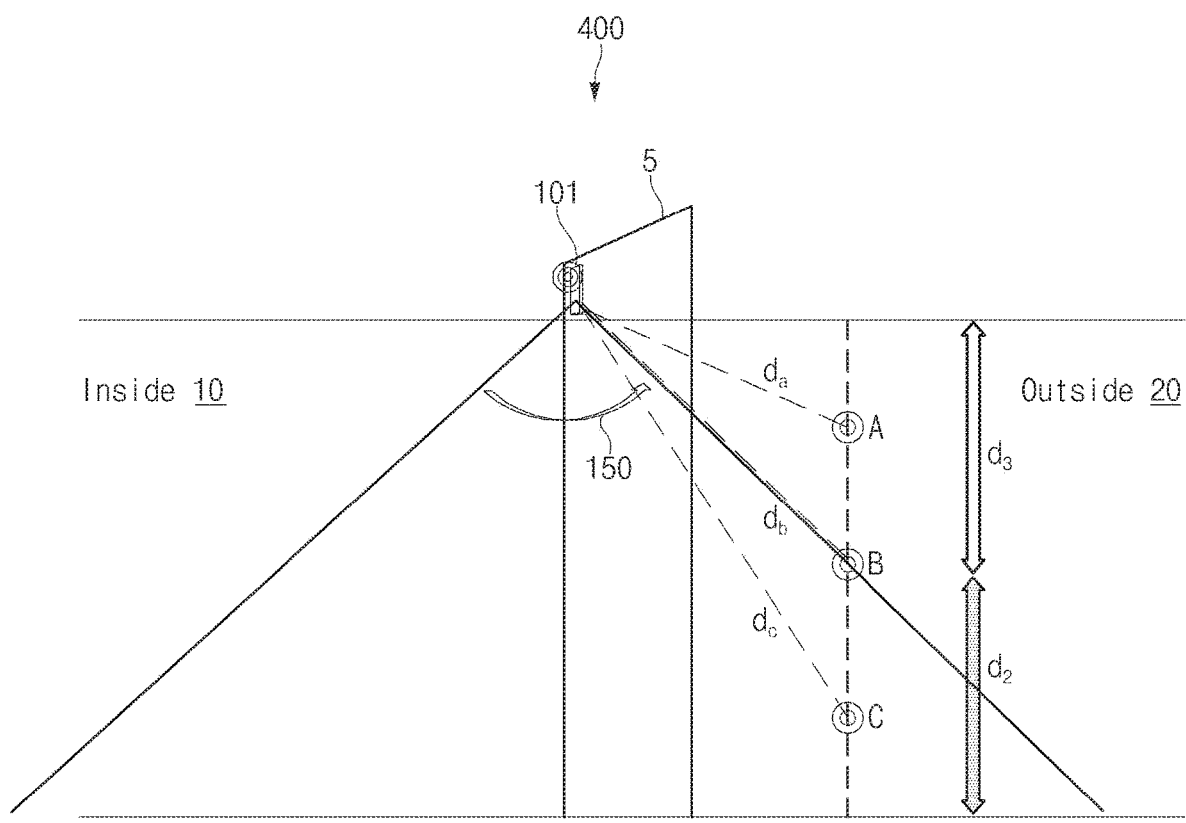
FIG. 4 illustrates an operating environment for changing a specified condition based on a height value of an external electronic device, according to an embodiment of the disclosure.

FIGS. 3 and 4 illustrate an operation of an electronic device changing a specified condition based on a height value of an external electronic device, according to various embodiments of the disclosure.

FIG. 3 illustrates an operating environment 300 (e.g., 1 of FIG. 1A) for obtaining the height value of the external electronic device 105; and FIG. 4 illustrates an operating environment 400 (e.g., 1 of FIG. 1A) for changing a specified condition based on the obtained height value.

As noted above, the user 50 may hold the external electronic device 105 in the top pocket A, the bag B, the suitcase C, or the bottom pocket D. Referring to FIG. 3, when the external electronic device 105 passes through a place (e.g., the door 5), at which the electronic device 101 is installed, the electronic device 101 may obtain a height value $d_{a2}$, $d_{b2}$, or $d_{c2}$ of the external electronic device 105. For example, when the angle between the electronic device 101 and the external electronic device 105 is the specified angle (e.g., 0 degrees), the electronic device 101 may measure a distance value $d_{a1}$, $d_{b1}$, or $d_{c1}$ between the electronic device 101 and the external electronic device 105. The electronic device 101 may be disposed at a specified height $d_1$ (e.g., 2 m), and thus the electronic device 101 may obtain the height value $d_{a2}$, $d_{b2}$, or $d_{c2}$ of the external electronic device 105, using the difference between the height $d_1$ of the electronic device 101 and the measured distance value $d_{a1}$, $d_{b1}$, or $d_{c1}$.

In the description later, it may be assumed that the height value $d_{b2}$ of the external electronic device 105 carried in the bag B is the same as a threshold height value $d_2$ (e.g., 1 m), the height value $d_{a2}$ of the external electronic device 105 carried in the top pocket A is greater than the threshold height value $d_2$, and the height value $d_{c2}$ of the external electronic device 105 carried in the suitcase C is less than the first threshold height value $d_2$. In other words, it may be assumed that the distance value $d_{b1}$ between the external electronic device 105 carried in the bag B and the electronic device 101 is the same as a second threshold height value $d_3$ (e.g., 1 m) when the angle between the electronic device 101 and the external electronic device 105 is the specified angle (e.g., 0 degrees), the distance value $d_{a1}$ between the external electronic device 105 carried in the top pocket A and the electronic device 101 is less than the second threshold height value $d_3$ when the angle between the electronic device 101 and the external electronic device 105 is the specified angle, and the distance value $d_{c1}$ between the external electronic device 105 carried in the suitcase C and the electronic device 101 is greater than the second threshold height value $d_3$ when the angle between the electronic device 101 and the external electronic device 105 is the specified angle.

Hereinafter, the height value of the external electronic device 105 may be referred to as the first height value; when the angle between the electronic device 101 and the external electronic device 105 is the specified angle (e.g., 0 degrees), the distance value between the electronic device 101 and the external electronic device 105 may be referred to as the second height value. Further, a straight-line distance (e.g., $d_a$, $d_b$, or $d_c$) is shown between the electronic device 101 and the external electronic device 105.

Referring to FIG. 4, the electronic device 101 may change the specified condition by comparing the first height value $d_{a2}$, $d_{b2}$, or $d_{c2}$ of the external electronic device 105 with the first threshold height value $d_2$. When the height value $d_{b2}$ of the external electronic device 105 carried in the bag B is the same as the first threshold height value $d_2$, the electronic device 101 may not change the specified condition. When the height value $d_{a2}$ of the external electronic device 105 carried in the top pocket A is greater than the first threshold height value $d_2$ or when the height value $d_{c2}$ of the external electronic device 105 carried in the suitcase C is less than the first threshold height value $d_2$, the electronic device 101 may change at least one of the reference time, the reference distance, or the reference angle by the difference between the height value $d_{a2}$ or $d_{c2}$ of the external electronic device 105 and the first threshold height value $d_2$.

For example, when the height value (e.g., $d_{a2}$ of FIG. 3) of the external electronic device 105 is greater than the first threshold height value $d_2$, the location of the external electronic device 105 may be out of the specified angle range 150 before the time goes beyond the reference time or before the distance value is not less than the reference distance. Because the accuracy of the tracking may be reduced when the location of the external electronic device 105 is out of the specified angle range 150, the electronic device 101 may set the reference time to be less than the default value (e.g., 2 seconds), may set the reference distance to be less than the default value (e.g., 2.5 m), or may set the reference angle to be less than the default value (e.g., 120 degrees). In a similar manner, when the height value (e.g., $d_{c2}$ of FIG. 3) of the external electronic device 105 is less than the first threshold height value $d_2$, the electronic device 101 may set the reference time to be greater than the default value, may set the reference distance to be greater than the default value, or may set the reference angle to be greater than the default value.

According to another embodiment, the electronic device 101 may change the specified condition by comparing the second height value $d_{a2}$, $d_{b2}$, or $d_{c2}$ with the second threshold height value $d_3$. For example, when the second height value (e.g., $d_{a1}$ of FIG. 3) of the external electronic device 105 is less than the third threshold height value $d_3$, the electronic device 101 may set the reference time to be less than the default value (e.g., 2 seconds), may set the reference distance to be less than the default value (e.g., 2.5 m), or may set the reference angle to be less than the default value (e.g., 120 degrees). In a similar manner, when the second height value (e.g., $d_{c1}$ of FIG. 3) of the external electronic device 105 is greater than the second threshold height value $d_3$, the electronic device 101 may set the reference time to be greater than the default value, may set the reference distance to be greater than the default value, or may set the reference angle to be greater than the default value.

Figure 5:
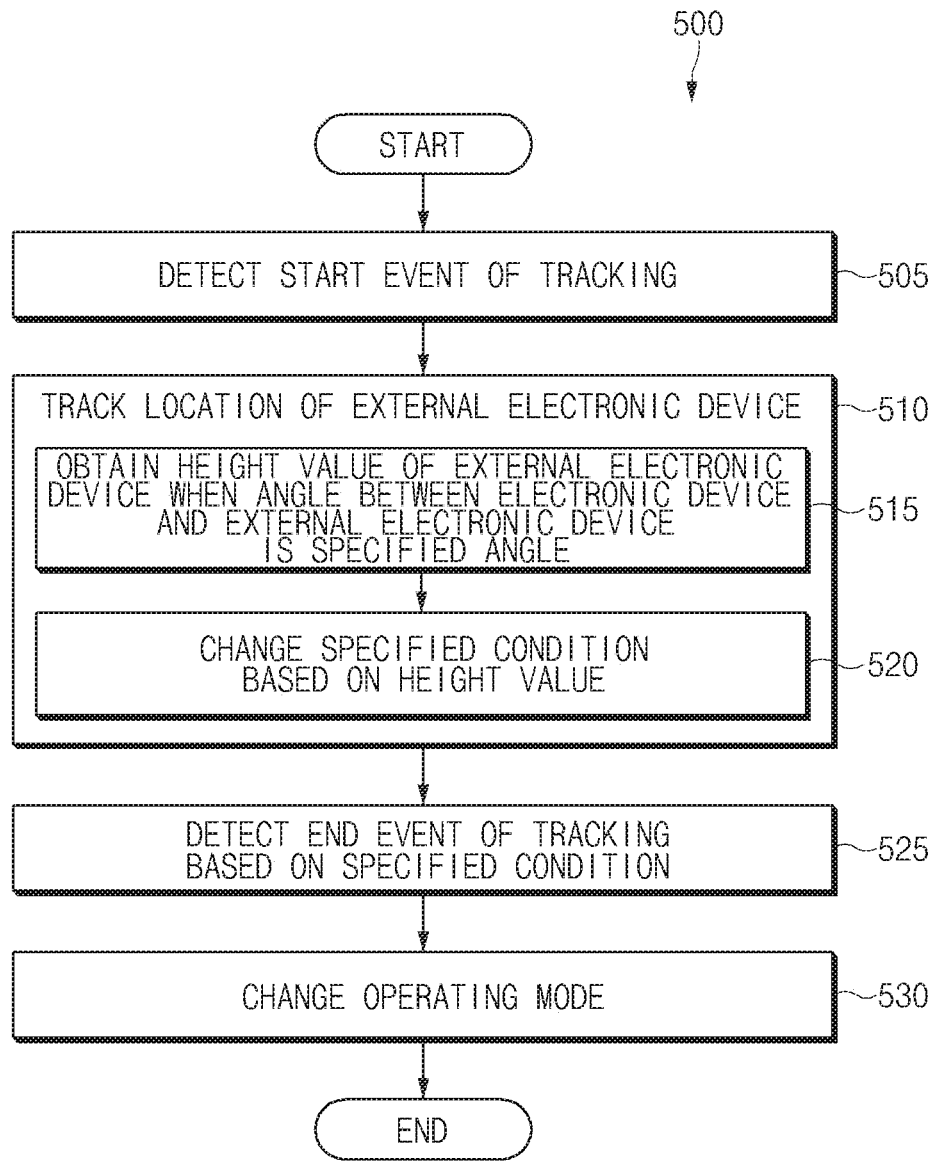
FIG. 5 illustrates an operation flowchart of an electronic device changing a specified condition based on a height value of an external electronic device, according to an embodiment of the disclosure.

FIG. 5 illustrates an operation flowchart of an electronic device changing a specified condition based on a height value of an external electronic device (e.g., 105 of FIG. 1A) according to an embodiment of the disclosure. Hereinafter, the operations illustrated in the operation flowchart 500 and other operation flowcharts (e.g., 600, 700, 900, and 1100) may be performed by the electronic device 101 or the component (e.g., the processor 220 of FIG. 2) of the electronic device 101.

Referring to FIG. 5, in operation 505 of flowchart 500, the electronic device 101 may detect the start event of tracking. For example, the electronic device 101 may detect the start event of the tracking, using the magnetic force between an external magnetic material (e.g., 102 of FIG. 1B) and the electronic device 101.

In operation 510, the electronic device 101 may track the location of an external electronic device. In operation 510, while the tracking is performed, the electronic device 101 may perform operation 515 and operation 520.

In operation 515, the electronic device 101 may obtain the height value (e.g., the first height value or the second height value of FIG. 3) of the external electronic device when the angle between the electronic device 101 and the external electronic device is the specified angle (e.g., 0 degrees).

In operation 520, the electronic device 101 may change the specified condition for detecting the end event of the tracking, based on the obtained height value. For example, the electronic device 101 may compare the obtained first height value with the first threshold height value (e.g., $d_2$ of FIG. 4) and may change at least one of a reference time, a reference distance, or a reference angle based on the result of comparison. For another example, the electronic device 101 may compare the obtained second height value and the second threshold height value (e.g., $d_3$ of FIG. 4) and may change at least one of the reference time, the reference distance, or the reference angle based on the result of comparison.

In operation 525, the electronic device 101 may detect the end event of the tracking based on the specified condition. For example, the electronic device 101 may detect that a door (e.g., 5 of FIG. 1A) is closed, using the magnetic force between an external magnetic material and the electronic device 101; when the time goes beyond the reference time after the door is closed, when the distance between the electronic device 101 and the external electronic device is not less than the reference distance, or when the angle between the electronic device 101 and the external electronic device 105 is out of the reference angle, the electronic device 101 may detect the end event of the tracking. When the end event of the tracking is detected, the electronic device 101 may terminate the tracking.

In operation 530, the electronic device 101 may change the operating mode associated with the electronic device 101, in response to the event that the tracking is terminated.

Through the above-described method, the electronic device 101 may terminate the tracking before a user (e.g., 50 of FIG. 1A) is out of the specified angle range (e.g., 150 of FIG. 1A), and thus the malfunction of the tracking may be prevented.

Although not illustrated in FIG. 5, the electronic device 101 may provide the UI indicating that the operating mode is changed. For example, the electronic device 101 may output the UI substantially simultaneously with changing the operating mode. For another example, when the distance between the electronic device 101 and the external electronic device on the x-axis is not less than the specified distance value (e.g., $d_x$ of FIG. 10), the electronic device 101 may output the UI.

Figure 6:
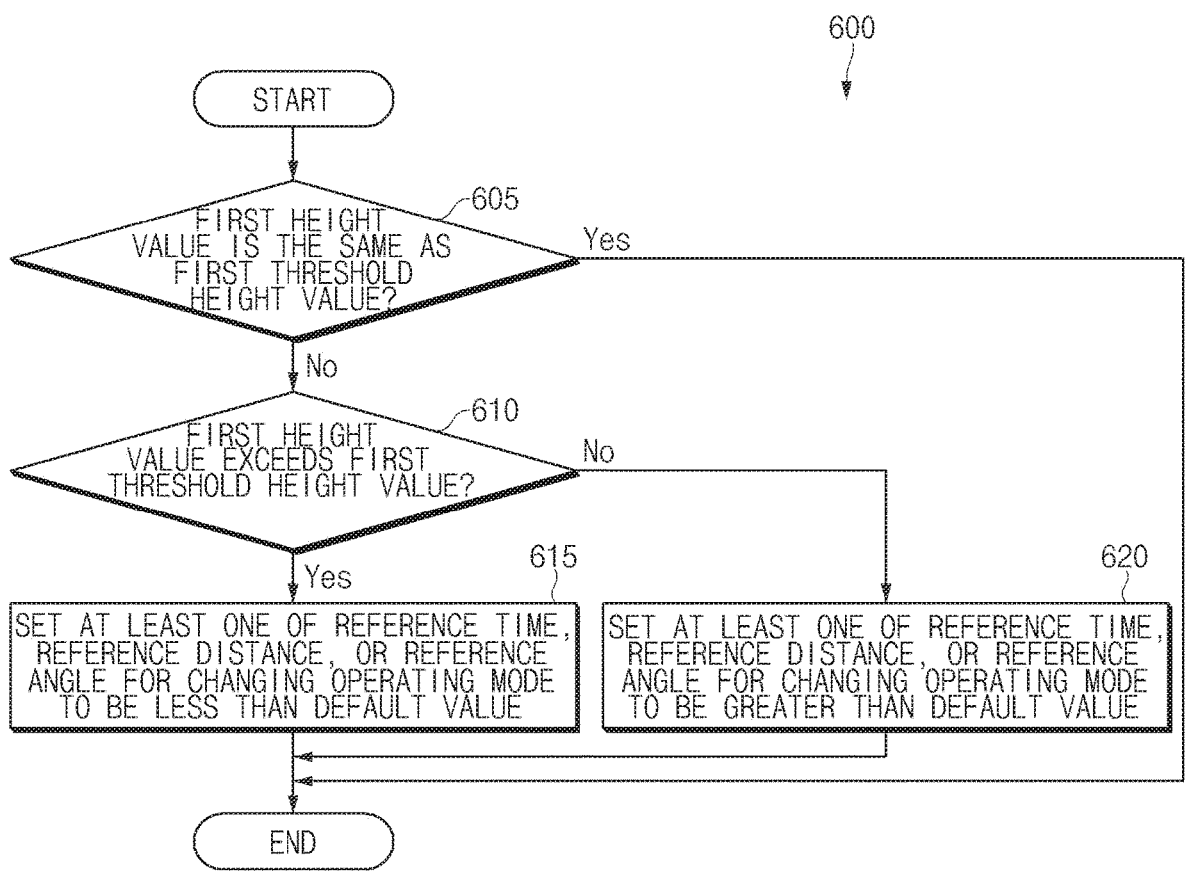
FIG. 6 illustrates an operation flowchart of an electronic device changing a specified condition based on a first height value of an external electronic device and a first threshold height value, according to an embodiment of the disclosure.

FIG. 6 illustrates an operation flowchart of an electronic device changing a specified condition based on a first height value (e.g., $d_{a2}$, $d_{b2}$, or $d_{c2}$ of FIG. 3) of an external electronic device and a first threshold height value (e.g., $d_2$ of FIG. 3), according to an embodiment of the disclosure. The operations illustrated in operation flowchart 600 may be an embodiment of operation 520 of FIG. 5.

Referring to FIG. 6, in operation 605 of operation flowchart 600, the electronic device 101 may identify whether the height value of an external electronic device (e.g., 105 of FIG. 1A) is the same as the first threshold height value. When the height value of the external electronic device is the same as the first threshold height value, the electronic device 101 may terminate an algorithm without changing the specified condition.

When the height value of the external electronic device is not the same as the first threshold height value, in operation 610, the electronic device 101 may identify whether the height value of the external electronic device exceeds the first threshold height value.

When the height value of the external electronic device exceeds the first threshold height value, in operation 615, the electronic device 101 may set at least one of a reference time, a reference distance, or a reference angle for changing the operating mode to be less than the default value.

When the height value of the external electronic device is less than the first threshold height value, in operation 620, the electronic device 101 may set at least one of a reference time, a reference distance, or a reference angle for changing the operating mode to be greater than the default value.

Figure 7:
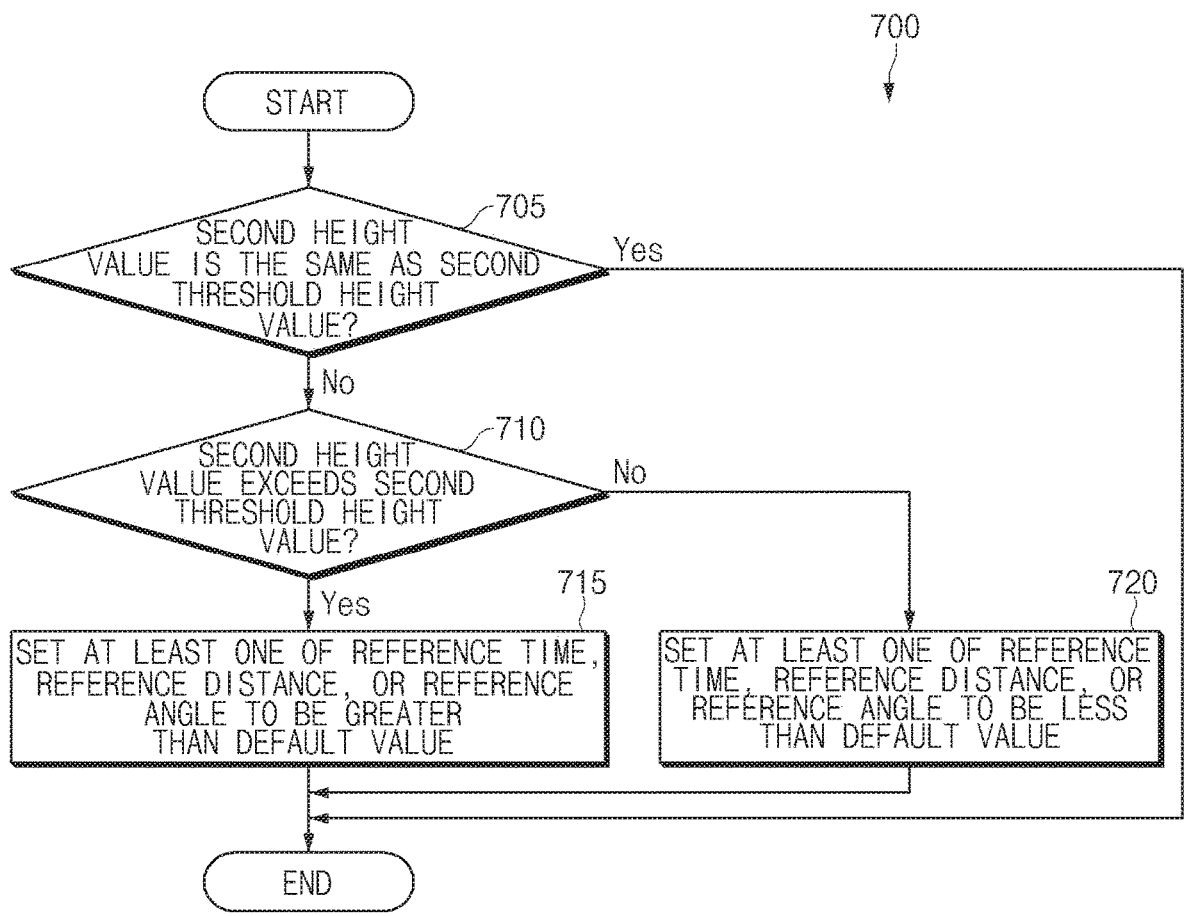
FIG. 7 illustrates an operation flowchart of an electronic device changing a specified condition based on a second height value of an external electronic device and a second threshold height value, according to an embodiment of the disclosure.

FIG. 7 illustrates an operation flowchart of an electronic device changing a specified condition based on a second height value (e.g., $d_{a1}$, $d_{b1}$, or $d_{c1}$ of FIG. 3) of an external electronic device and a second threshold height value (e.g., $d_3$ of FIG. 3), according to an embodiment of the disclosure. The operations illustrated in operation flowchart 700 may be an embodiment of operation 520 of FIG. 5.

Referring to FIG. 7, in operation 705 of operation flowchart 700, the electronic device 101 may identify whether the second height value of an external electronic device is the same as the second threshold height value. When the second height value is the same as the second threshold height value, the electronic device 101 may terminate an algorithm without changing the specified condition.

When the second height value is not the same as the second threshold height value, in operation 710, the electronic device 101 may identify whether the second height value exceeds the second threshold height value.

When the second height value of the external electronic device exceeds the second threshold height value, in operation 715, the electronic device 101 may set a reference time, a reference distance, or a reference angle for changing the operating mode to be greater than the default value.

When the second height value of the external electronic device is less than the second threshold height value, in operation 720, the electronic device 101 may set a reference time, a reference distance, or a reference angle for changing the operating mode to be less than the default value.

Through the above-described method, when the second height value is used instead of the first height value, the electronic device 101 may perform computation directly using the distance between the electronic device 101 and the external electronic device 105, and thus the electronic device 101 may reduce the amount of computation.

Figure 8:
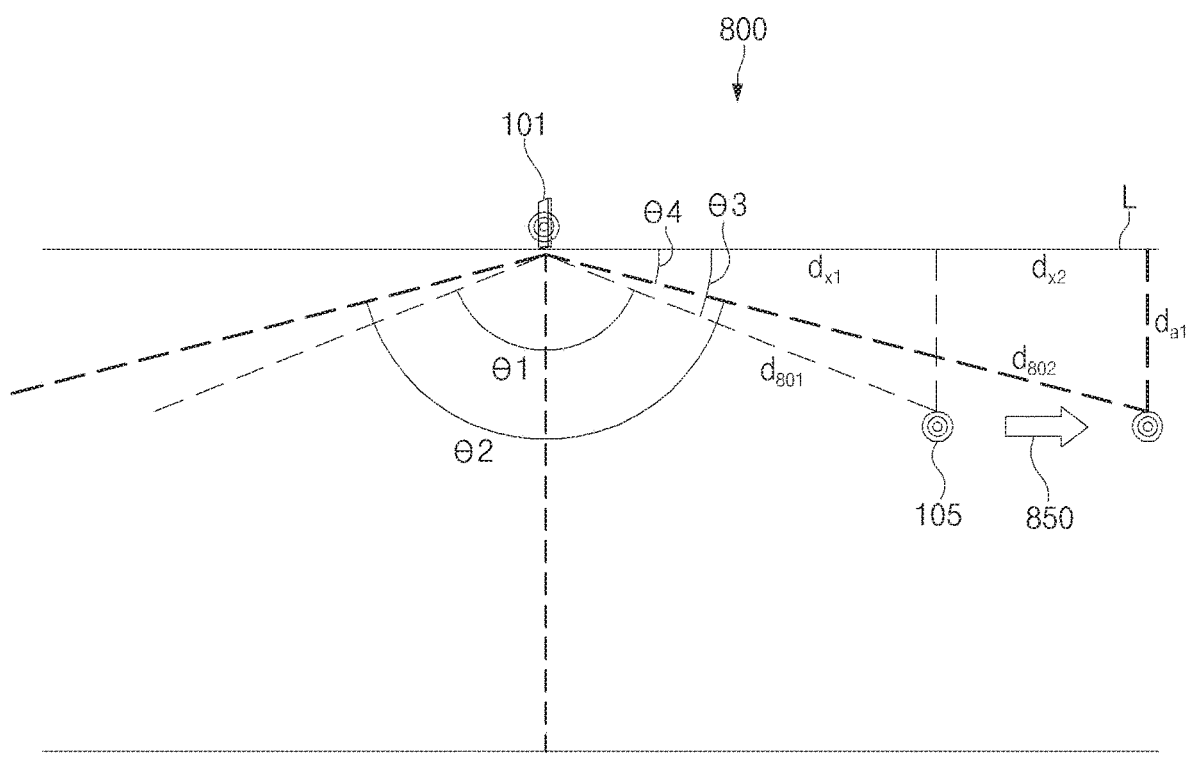
FIG. 8 illustrates an operating environment for estimating an angle value based on a distance value, according to an embodiment of the disclosure.

FIG. 8 illustrates an operating environment (e.g., 1 of FIG. 1A) for estimating an angle value based on a distance value, according to an embodiment of the disclosure. It may be assumed in FIG. 8 that a first height value of the external electronic device 105 is greater than a first threshold height value.

As noted above, the user 50 (not shown) may hold the external electronic device 105 in the top pocket A, the bag B, the suitcase C, or the bottom pocket D. Referring to FIG. 8, the location of the external electronic device 105 in an operating environment 800 may move in a specified direction 850 by the movement of a user (e.g., 50 of FIG. 1A). The angle value between the electronic device 101 and the external electronic device 105 before the external electronic device 105 moves may be referred to as a "first angle value $\theta_1$"; the angle value between the electronic device 101 and the external electronic device 105 after the external electronic device 105 moves in the specified direction 850 may be referred to as a "second angle value $\theta_2$". The first angle value $\theta_1$ may be less than the specified angle range (e.g., 150 of FIG. 1A); the second angle value $\theta_2$ may be greater than the specified angle range. In other words, when the external electronic device 105 moves in the specified direction 850, the location of the external electronic device 105 may be out of the specified angle range.

When the location of the external electronic device 105 is out of the specified angle range, the accuracy of the measurement of the second angle value $\theta_2$ may be reduced by the sudden change of a phase. According to an embodiment, when the location of the external electronic device 105 is out of the specified angle range, the electronic device 101 may estimate an angle value based on the distance value (e.g., $d_{801}$ or $d_{802}$) between the electronic device 101 and the external electronic device without measuring an angle afterward.

For example, the electronic device 101 may calculate $d_{x1}$ and $d_{x2}$ using Equation 1 below.

$$d_{x1} = \sqrt{(d_{801})^2 - (d_{a1})^2}$$

$$d_{x2} = \sqrt{(d_{802})^2 - (d_{a1})^2}$$

Equation 1

In this case, $d_{x1}$ and $d_{x2}$ may denote distances between the electronic device 101 and the external electronic device 105 on the x-axis; $d_{801}$ and $d_{802}$ may denote distances (straight-line distances) between the electronic device 101 and the external electronic device 105; and $d_{a1}$ may denote a distance value (e.g., $d_{a1}$, $d_{b1}$, or $d_{c1}$ of FIG. 3) when the angle between the electronic device 101 and the external electronic device 105 is 0 degrees.

The electronic device 101 may calculate $\theta_3$ and $\theta_4$ using $d_{x1}$ and $d_{x2}$ and Equation 2 below.

$$\tan\theta_3 = \frac{d_{a1}}{d_{x1}}$$

$$\tan\theta_4 = \frac{d_{a1}}{d_{x2}}$$

Equation 2

In this case, $\theta_3$ and $\theta_4$ may denote angles formed by the electronic device 101 and the external electronic device 105 based on a straight line L. The electronic device 101 may estimate the second angle value $\theta_2$, using $\theta_3$, $\theta_4$, and Equation 3 below.

$$\theta_2 = \theta_1 + \{2S(\theta_3 - \theta_4)\}$$

Equation 3

Figure 9:
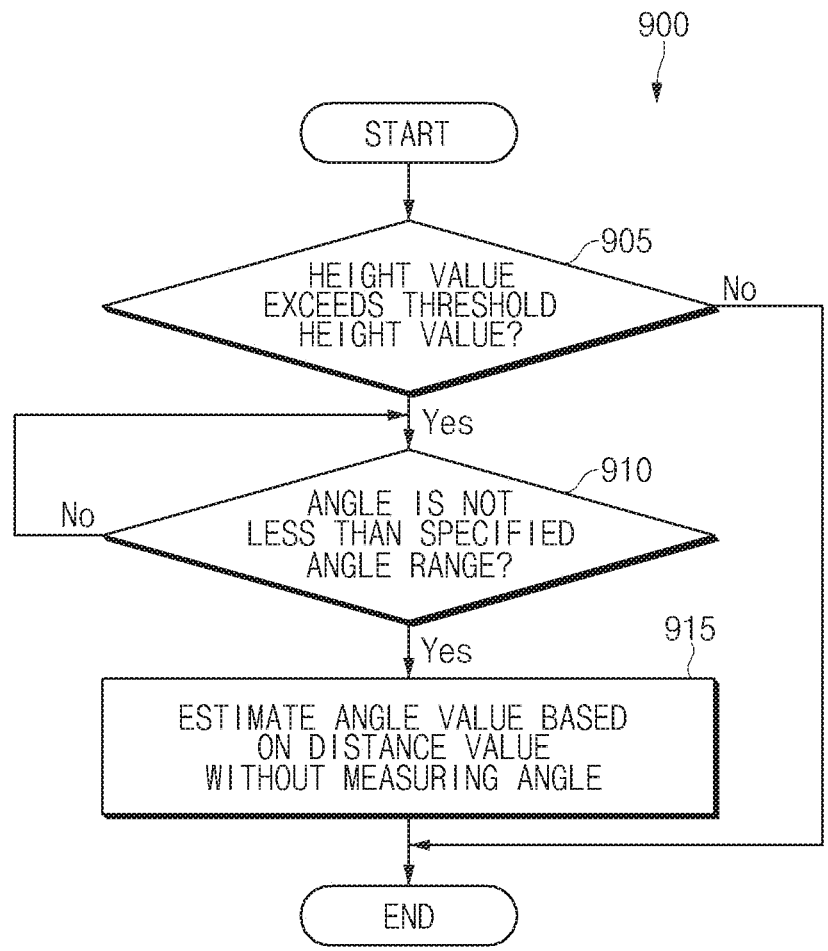
FIG. 9 illustrates an operation flowchart of an electronic device estimating an angle value based on a distance value, according to an embodiment of the disclosure.

FIG. 9 illustrates an operation flowchart of an electronic device estimating an angle value based on a distance value, according to an embodiment of the disclosure. The operations illustrated in an operation flowchart 900 may be an embodiment of operation 520 of FIG. 5.

Referring to FIG. 9, in operation 905, the electronic device 101 may identify whether the height value (e.g., the first height value $d_{a2}$, $d_{b2}$, or $d_{c2}$ of FIG. 3) of the external electronic device 105 exceeds a threshold height value (e.g., the first threshold height value $d_2$ of FIG. 3). When the height value does not exceed the threshold height value, the electronic device 101 may terminate the algorithm of FIG. 9.

FIG. 9 illustrates an embodiment in which the first height value is compared with the first threshold height value. However, according to other embodiments, the electronic device 101 may compare a second height value with a second threshold height value. For example, when the second height value (e.g., $d_{a1}$, $d_{b1}$, or $d_{c1}$ of FIG. 3) of the external electronic device 105 is not less than the second threshold height value (e.g., $d_3$ of FIG. 3), the electronic device 101 may perform operation 910; when the second height value is less than the second threshold height value, the electronic device 101 may terminate the algorithm of FIG. 9.

When the height value exceeds the threshold height value, in operation 910, the electronic device 101 may identify whether an angle (e.g., $\theta_1$ or $\theta_2$ of FIG. 8) between the electronic device 101 and the external electronic device 105 is not less than a specified angle range (e.g., 150 of FIG. 1A). According to another embodiment, when a reference angle is the same as the specified angle range, the electronic device 101 may identify whether an angle between the electronic device 101 and the external electronic device 105 is not less than the reference angle. When the angle between the electronic device 101 and the external electronic device 105 is less than the specified angle range, the electronic device 101 may repeatedly perform operation 910 while a tracking operation is performed. When the angle between the electronic device 101 and the external electronic device 105 is not less than the specified angle range, in operation 915, the electronic device 101 may estimate an angle value based on the distance value without measuring the angle through a plurality of antennas (e.g., 210-1 and 210-2 of FIG. 2). For example, the electronic device 101 may estimate the second angle value $\theta_2$ according to Equations 1 to 3.

Through the above-described method, the electronic device 101 may track the angle value even after the external electronic device 105 is out of the specified angle range, and thus the electronic device 101 may continuously perform the tracking without malfunctions even though the external electronic device 105 is positioned at a high place.

Figure 10:
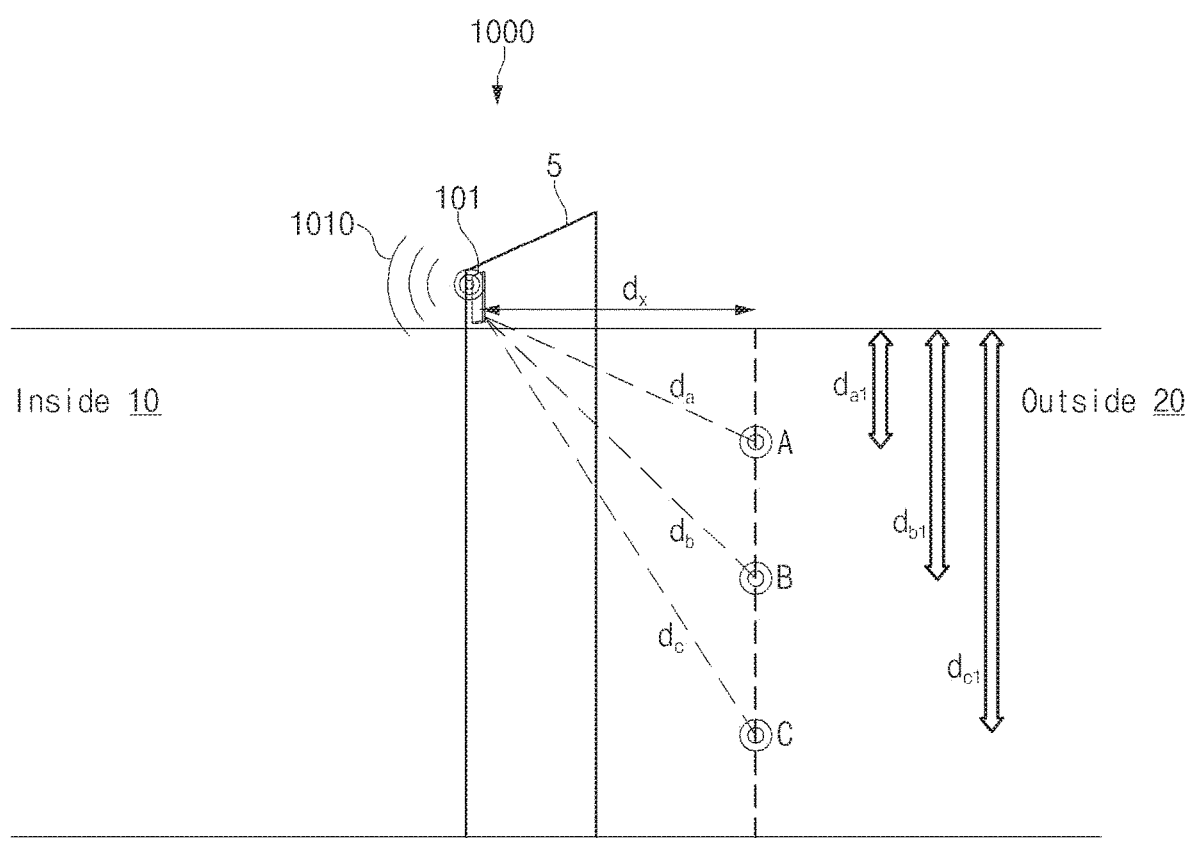
FIG. 10 illustrates an operation flowchart for outputting a user interface (UI) indicating that an operating mode is changed, according to an embodiment of the disclosure.

FIG. 10 illustrates an operating environment (e.g., 1 of FIG. 1A) for outputting a UI indicating that an operating mode is changed, according to an embodiment of the disclosure.

FIG. 10 illustrates an embodiment in which the electronic device 101 outputs a UI. However, according to other embodiments, the electronic device 101 may notify a user of the change of an operating mode by transmitting data indicating that the operating mode is changed, to a smartphone or a wearable device held by the user.

As noted above, the user 50 (not shown) may hold the external electronic device 105 in the top pocket A, the bag B, the suitcase C, or the bottom pocket D. Referring to FIG. 10, the electronic device 101 in an operating environment 1000 may output the UI (e.g., sound 1010) indicating that the operating mode is changed, through an output device (e.g., a speaker) included in the electronic device 101. According to an embodiment, the electronic device 101 may output the UI, after the operating mode is changed in operation 530 of FIG. 5 or substantially simultaneously with the change of the operating mode.

According to another embodiment, the electronic device 101 may provide the UI based on the distance value between the electronic device 101 and the external electronic device 105 on the x-axis such that the user 50 is capable of receiving the UI in the same place (e.g., front door). In this case, the electronic device 101 may obtain the distance value (hereinafter, referred to as a 'second distance value') between the electronic device 101 and the external electronic device 105 on the x-axis, based on the straight-line distance (e.g., $d_a$, $d_b$, or $d_c$) (hereinafter, referred to as a 'first distance value') between the electronic device 101 and the external electronic device 105. For example, the electronic device 101 may measure the first distance value through a plurality of antennas (e.g., 210-1 and 210-2 of FIG. 2) and may obtain the second distance value, using the distance value $d_{a1}$, $d_{b1}$, or $d_{c1}$ obtained in FIG. 3, the first distance value, and Equation 1. When the obtained second distance value is not less than a threshold distance value $d_x$, the electronic device 101 may provide the UI.

Figure 11:
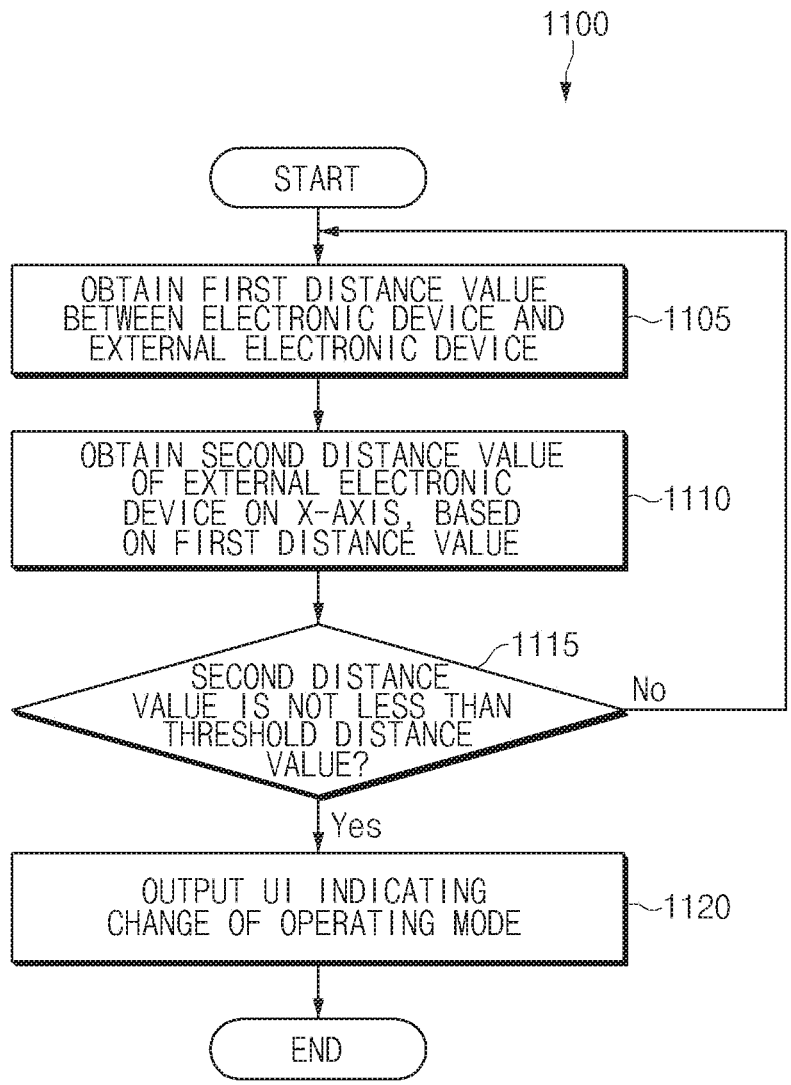
FIG. 11 illustrates an operation flowchart of an electronic device outputting a UI indicating that an operating mode is changed, according to an embodiment of the disclosure.

FIG. 11 illustrates an operation flowchart of an electronic device outputting a UI indicating that an operating mode is changed, according to an embodiment of the disclosure. The operations illustrated in operation flowchart 1100 may be performed independently of operation 530 of FIG. 5 or may be performed substantially simultaneously with operation 530 or after operation 530.

Referring to FIG. 11, in operation 1105, the electronic device 101 may obtain the first distance value (e.g., $d_a$, $d_b$, or $d_c$ of FIG. 10) between the electronic device 101 and an external electronic device (e.g., 105 of FIG. 1A). According to an embodiment, the electronic device 101 may measure the first distance value by transmitting or receiving a signal through a plurality of antennas (e.g., 210-1 and 210-2 of FIG. 2).

In operation 1110, the electronic device 101 may obtain the second distance value of the external electronic device on the x-axis, based on the first distance value. For example, the electronic device 101 may obtain the second distance value, using the first distance value, the height value of the external electronic device, and Equation 1.

In operation 1115, the electronic device 101 may identify whether the second distance value is not less than a threshold distance value (e.g., $d_x$ of FIG. 10). When the second distance value is less than the threshold distance value, the electronic device 101 may repeatedly perform operation 1105 to operation 1115.

When the second distance value is not less than the threshold distance value, in operation 1120, the electronic device 101 may output the UI indicating the change of the operating mode.

In this way, when a user is spaced from the electronic device 101 on the x-axis by a specific distance regardless of the height of the external electronic device 105 held by the user, the electronic device 101 may provide the user with the stability of an operation by notifying the user that the operating mode is changed.

Figure 12:
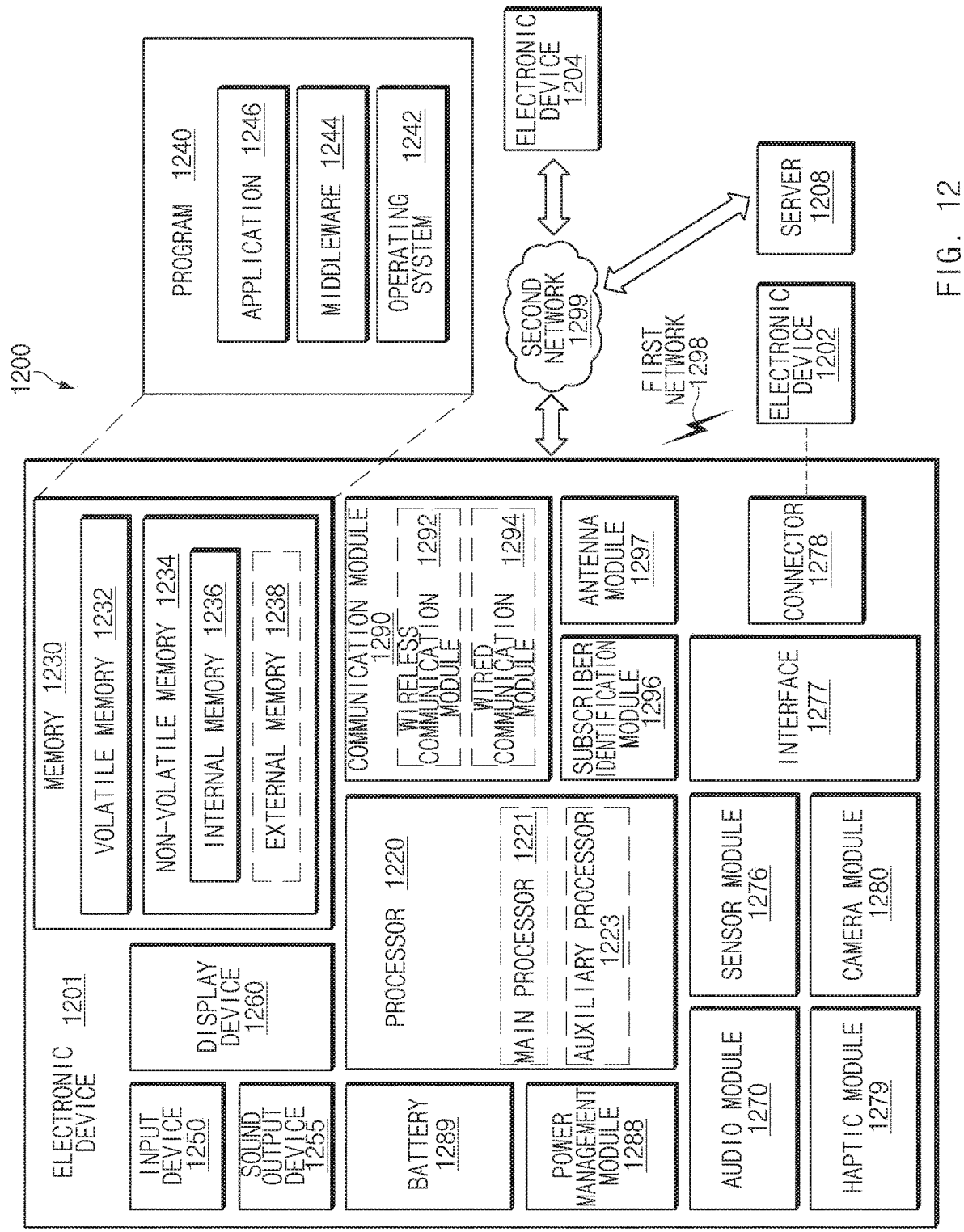
FIG. 12 is a block diagram illustrating an electronic device in a network environment according to an embodiment of the disclosure.

FIG. 12 is a block diagram illustrating an electronic device in a network environment according to an embodiment of the disclosure.

Referring to FIG. 12, the electronic device 1201 in a network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include at least one processor 1220, memory 1230, an input device 1250, the sound output device 1255, the display device 1260, an audio module 1270, a sensor module 1276, an interface 1277, the haptic module 1279, a camera module 1280, a power management module 1288, a battery 1289, a communication module 1290, a subscriber identification module (SIM) 1296, and/or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 and/or the non-volatile memory 1234. The non-volatile memory 1234 can further include an internal memory 1236 and/or an external memory 1238.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to or consumed by the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., printed circuit board (PCB)). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

As described above, an electronic device (e.g., 101 of FIG. 1A) may include a plurality of antennas (e.g., 210-1 and 210-2 of FIG. 2) transmitting or receiving a signal to or from an external electronic device (e.g., 105 of FIG. 1A) and at least one processor (e.g., 220 of FIG. 2) operatively connected to the plurality of antennas. The at least one processor may be configured to detect a start event of tracking using an external magnetic material (e.g., 102 of FIG. 1B) positioned at a location adjacent to the electronic device, to track a location of the external electronic device, using the plurality of antennas, while the tracking is performed, to obtain a height value (e.g., first height value) of the external electronic device, when an angle between the electronic device and the external electronic device is a specified angle (e.g., 0 degrees), and to change a specified condition based on the obtained height value, to detect an end event of the tracking based on the specified condition, and to change an operating mode associated with the electronic device, in response to detecting the end event of the tracking.

According to an embodiment, the at least one processor may be configured to detect the start event of the tracking when magnetic force between the external magnetic material and the electronic device is less than a threshold value, to detect that the magnetic force is not less than the threshold value while the tracking is performed, and to detect the end event of the tracking after the magnetic force is not less than the threshold value, when time goes beyond reference time or more, when a distance between the electronic device and the external electronic device is not less than a reference distance, or when the angle between the electronic device and the external electronic device is not less than a reference angle.

According to an embodiment, the at least one processor may be configured to set at least one of the reference time or the reference distance to be less than a default value when the height value exceeds a threshold height value and to set the at least one of the reference time or the reference distance to be greater than the default value when the height value is less than the threshold height value.

According to an embodiment, the at least one processor may be configured to set the reference angle to be less than a default value when the height value exceeds a threshold height value and to set the reference angle to be greater than the default value when the height value is less than the threshold height value.

According to an embodiment, the at least one processor may be configured to identify that the height value exceeds a threshold height value and to estimate the angle based on a distance value without measuring the angle, in a range in which the angle between the electronic device and the external electronic device is not less than a specified angle range (e.g., 150 of FIG. 1A), while the tracking is performed.

According to an embodiment, the electronic device may further include a speaker (e.g., the sound output device 1255 of FIG. 12). The at least one processor may be configured to obtain a first distance value between the electronic device and the external electronic device, to obtain a second distance value of the external electronic device on x-axis, based on the first distance value, and to output a user interface (UI) indicating that the operating mode is changed, through the speaker when the second distance value is not less than a threshold distance value.

According to an embodiment, the plurality of antennas may transmit or receive a signal in an ultra-wide band (UWB), and the at least one processor may process a signal based on a UWB protocol.

According to an embodiment, the operating mode associated with the electronic device may include at least one of a security mode or a power saving mode.

As described above, a method of an electronic device may include detecting a start event of tracking, using an external magnetic material positioned at a location adjacent to the electronic device, tracking a location of an external electronic device, obtaining a height value of the external electronic device while the tracking is performed, when an angle between the electronic device and the external electronic device is a specified angle, changing a specified condition based on the obtained height value while the tracking is performed, detecting an end event of the tracking based on the specified condition, and changing an operating mode associated with the electronic device, in response to detecting the end event of the tracking.

According to an embodiment, the detecting of the start event of the tracking may include detecting the start event of the tracking when magnetic force between the external magnetic material and the electronic device is less than a threshold value. The detecting of the end event of the tracking may include detecting that the magnetic force is not less than the threshold value while the tracking is performed and detecting that time goes beyond reference time or more, a distance between the electronic device and the external electronic device is not less than a reference distance, or the angle between the electronic device and the external electronic device is not less than a reference angle after the magnetic force is not less than the threshold value.

According to an embodiment, the changing of the specified condition may include setting at least one of the reference time or the reference distance to be less than a default value when the height value exceeds a threshold height value or setting the at least one of the reference time or the reference distance to be greater than the default value when the height value is less than the threshold height value.

According to an embodiment, the changing of the specified condition may include setting the reference angle to be less than a default value when the height value exceeds a threshold height value or setting the reference angle to be greater than the default value when the height value is less than the threshold height value.

According to an embodiment, the tracking of the location of the external electronic device may include identifying whether the angle between the electronic device and the external electronic device is not less than the reference angle when the height value exceeds a threshold height value and estimating the angle based on a distance value without measuring the angle between the electronic device and the external electronic device, in a range in which the angle is not less than the reference angle.

According to an embodiment, the method may further include obtaining a first distance value between the electronic device and the external electronic device, obtaining a second distance value of the external electronic device on x-axis, based on the first distance value, and outputting a UI indicating that the operating mode is changed when the second distance value is not less than a threshold distance value.

According to an embodiment, the tracking of the location of the external electronic device may include obtaining at least one of time of flight (ToF) or angle of arrival (AoA) by transmitting or receiving a signal in UWB.

As described above, an electronic device (e.g., 101 of FIG. 1A) may include a plurality of antennas (e.g., 210-1 and 210-2 of FIG. 2) transmitting or receiving a signal in UWB to or from an external electronic device (e.g., 105 of FIG. 1A) and at least one processor (e.g., 220 of FIG. 2) operatively connected to the plurality of antennas and processing a signal based on a UWB protocol. The at least one processor may be configured to detect a start event of tracking, using an external magnetic material (e.g., 102 of FIG. 1B) positioned at a location adjacent to the electronic device, to track a location of the external electronic device, using the plurality of antennas, while the tracking is performed, to obtain a height value (e.g., first height value) of the external electronic device, when an angle between the electronic device and the external electronic device is '0' and to change a specified condition based on the obtained height value, to detect an end event of the tracking based on the specified condition, and to change an operating mode associated with the electronic device, in response to detecting the end event of the tracking.

According to an embodiment, the at least one processor may be configured to detect the start event of the tracking when magnetic force between the external magnetic material and the electronic device is less than a threshold value, to detect that the magnetic force is not less than the threshold value while the tracking is performed, and to detect the end event of the tracking after the magnetic force is not less than the threshold value, when elapsing time is less than reference time, when a distance between the electronic device and the external electronic device is not less than a reference distance, or when an angle between the electronic device and the external electronic device is not less than a reference angle.

According to an embodiment, the at least one processor may be configured to set at least one of the reference time or the reference distance to be less than a default value when the height value exceeds a threshold height value and to set the at least one of the reference time or the reference distance to be greater than the default value when the height value is less than the threshold height value.

According to an embodiment, the at least one processor may be configured to set the reference angle to be less than a default value when the height value exceeds a threshold height value and to set the reference angle to be greater than the default value when the height value is less than the threshold height value.

According to an embodiment, the electronic device may further include a speaker (e.g., the sound output device 1255 of FIG. 12). The at least one processor may be configured to output a UI indicating that the operating mode is changed, through the speaker.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., the internal memory 1236 or the external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device may constantly detect the location of a user regardless of the location of an external electronic device held by the user.

According to various embodiments of the disclosure, an electronic device may precisely detect the location of the user, using a signal in a UWB exchanged between the electronic device and the external electronic device.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a plurality of antennas configured to communicate with an external electronic device; and
   at least one processor operatively connected to the plurality of antennas, wherein the at least one processor is configured to:
   detect a tracking start event using an external magnetic material positioned at a location adjacent to the electronic device,
   track a location of the external electronic device using the plurality of antennas,
   while the tracking is performed, obtain a height value of the external electronic device when an angle between the electronic device and the external electronic device is a specified angle,
   change a specified condition based on the obtained height value,
   detect a tracking end event based on the specified condition, and
   change an operating mode associated with the electronic device in response to detecting the tracking end event.

2. The electronic device of claim 1, wherein the at least one processor is further configured to:
   when a magnetic force between the external magnetic material and the electronic device is less than a threshold value, detect the tracking start event;
   while the tracking is performed, detect that the magnetic force is greater than the threshold value; and
   after the magnetic force is greater than the threshold value, detect the tracking end event when:
   time goes beyond a reference time, a distance between the electronic device and the external electronic device is greater than a reference distance, or the angle between the electronic device and the external electronic device is greater than a reference angle.

3. The electronic device of claim 2, wherein the at least one processor is further configured to:
when the height value exceeds a threshold height value, set at least one of the reference time or the reference distance to be less than a default value; and
when the height value is less than the threshold height value, set the at least one of the reference time or the reference distance to be greater than the default value.

4. The electronic device of claim 2, wherein the at least one processor is further configured to:
when the height value exceeds a threshold height value, set the reference angle to be less than a default value; and
when the height value is less than the threshold height value, set the reference angle to be greater than the default value.

5. The electronic device of claim 2, wherein the at least one processor is further configured to:
identify that the height value exceeds a threshold height value; and
while the tracking is performed, estimate the angle based on a distance value without measuring the angle in a range in which the angle between the electronic device and the external electronic device is greater than a specified angle range.

6. The electronic device of claim 1, further comprising:
a speaker,
wherein the at least one processor is further configured to:
obtain a first distance value between the electronic device and the external electronic device,
obtain a second distance value of the external electronic device on an x-axis based on the first distance value, and
when the second distance value is greater than a threshold distance value, output a user interface (UI) indicating that the operating mode is changed, through the speaker.

7. The electronic device of claim 1,
wherein the plurality of antennas transmit or receive a signal in an ultra-wide band (UWB), and
wherein the at least one processor is further configured to process a signal based on a UWB protocol.

8. The electronic device of claim 1, wherein the operating mode associated with the electronic device comprises at least one of a security mode or a power saving mode.

9. A method of an electronic device, the method comprising:
detecting a tracking start event using an external magnetic material positioned at a location adjacent to the electronic device;
tracking a location of the external electronic device;
while the tracking is performed, when an angle between the electronic device and the external electronic device is a specified angle, obtaining a height value of the external electronic device;
while the tracking is performed, changing a specified condition based on the obtained height value;
detecting a tracking end event based on the specified condition; and
changing an operating mode associated with the electronic device in response to detecting the tracking end event.

10. The method of claim 9,
wherein the detecting of the tracking start event comprises:
when a magnetic force between the external magnetic material and the electronic device is less than a threshold value, detecting the tracking start event, and
wherein the detecting of the tracking end event comprises:
while the tracking is performed, detecting that the magnetic force is greater than the threshold value; and
after the magnetic force is greater than the threshold value, detecting at least one of:
time goes beyond a reference time,
a distance between the electronic device and the external electronic device is greater than a reference distance, or
the angle between the electronic device and the external electronic device is greater than a reference angle.

11. The method of claim 10, wherein the changing of the specified condition includes:
when the height value exceeds a threshold height value, setting at least one of the reference time or the reference distance to be less than a default value; or
when the height value is less than the threshold height value, setting the at least one of the reference time or the reference distance to be greater than the default value.

12. The method of claim 10, wherein the changing of the specified condition includes:
when the height value exceeds a threshold height value, setting the reference angle to be less than a default value; or
when the height value is less than the threshold height value, setting the reference angle to be greater than the default value.

13. The method of claim 10, wherein the tracking of the location of the external electronic device includes:
when the height value exceeds a threshold height value, identifying whether the angle between the electronic device and the external electronic device is greater than the reference angle; and
estimating the angle based on a distance value without measuring the angle between the electronic device and the external electronic device in a range in which the angle is greater than the reference angle.

14. The method of claim 9, further comprising:
obtaining a first distance value between the electronic device and the external electronic device;
obtaining a second distance value of the external electronic device on an x-axis based on the first distance value; and
when the second distance value is greater than a threshold distance value, outputting a user interface (UI) indicating that the operating mode is changed.

15. The method of claim 9, wherein the tracking of the location of the external electronic device comprises:
obtaining at least one of time of flight (ToF) or angle of arrival (AoA) by transmitting or receiving a signal in ultra-wide band (UWB).

16. An electronic device comprising:
a plurality of antennas configured to exchange a signal in ultra-wide band (UWB) with an external electronic device; and at least one processor operatively connected to the plurality of antennas and configured to process a signal based on a UWB protocol, wherein the at least one processor is configured to:
- detect a tracking start event using an external magnetic material positioned at a location adjacent to the electronic device,
- track a location of the external electronic device using the plurality of antennas,
- while the tracking is performed, obtain a height value of the external electronic device when an angle between the electronic device and the external electronic device is '0' and change a specified condition based on the obtained height value,
- detect a tracking end event based on the specified condition, and
- change an operating mode associated with the electronic device in response to detecting the tracking end event.

17. The electronic device of claim 16, wherein the at least one processor is further configured to:
- when a magnetic force between the external magnetic material and the electronic device is less than a threshold value, detect the tracking start event;
- while the tracking is performed, detect that the magnetic force is greater than the threshold value; and
- after the magnetic force is greater than the threshold value, detect the tracking end event when:
  - elapsing time is less than a reference time,
  - a distance between the electronic device and the external electronic device is greater than a reference distance, or
  - an angle between the electronic device and the external electronic device is greater than a reference angle.

18. The electronic device of claim 17, wherein the at least one processor is further configured to:
- when the height value exceeds a threshold height value, set at least one of the reference time or the reference distance to be less than a default value; and
- when the height value is less than the threshold height value, set the at least one of the reference time or the reference distance to be greater than the default value.

19. The electronic device of claim 17, wherein the at least one processor is further configured to:
- when the height value exceeds a threshold height value, set the reference angle to be less than a default value; and
- when the height value is less than the threshold height value, set the reference angle to be greater than the default value.

20. The electronic device of claim 16, further comprising: a speaker, wherein the at least one processor is further configured to:
output a user interface (UI) indicating that the operating mode is changed through the speaker.

* * * * *